(12) United States Patent
Wogritsch et al.

(10) Patent No.: US 10,809,211 B2
(45) Date of Patent: Oct. 20, 2020

(54) MODULAR SPECIMEN HOLDERS FOR HIGH PRESSURE FREEZING AND X-RAY CRYSTALLOGRAPHY OF A SPECIMEN

(71) Applicant: LEICA MIKROSYSTEME GMBH, Vienna (AT)

(72) Inventors: Rainer Wogritsch, Vienna (AT); Cveta Tomova, Vienna (AT); Paul Wurzinger, Deutsch-Wagram (AT); Heinz Plank, Wiener Neudorf (AT); Siegfried Tanki, Vienna (AT)

(73) Assignee: Leica Mikrosysteme GmbH, Vienna (AT)

(*) Notice: Subject to any disclaimer, the term of this patent is extended or adjusted under 35 U.S.C. 154(b) by 0 days.

(21) Appl. No.: 16/327,835

(22) PCT Filed: Jul. 13, 2017

(86) PCT No.: PCT/EP2017/067696
§ 371 (c)(1),
(2) Date: Feb. 24, 2019

(87) PCT Pub. No.: WO2018/036718
PCT Pub. Date: Mar. 1, 2018

(65) Prior Publication Data
US 2019/0195814 A1    Jun. 27, 2019

(30) Foreign Application Priority Data
Aug. 26, 2016   (EP) ..................................... 16186050

(51) Int. Cl.
*G01N 23/20* (2018.01)
*G01N 23/20033* (2018.01)
(Continued)

(52) U.S. Cl.
CPC ......... *G01N 23/20033* (2013.01); *G01N 1/42* (2013.01); *G01N 23/20025* (2013.01); *G01N 23/20041* (2013.01)

(58) Field of Classification Search
CPC ............... G01N 23/20033; G01N 1/42; G01N 23/20041; G01N 23/20025
See application file for complete search history.

(56) References Cited

U.S. PATENT DOCUMENTS 6,404,849 B1   6/2002  Olson et al.
7,660,389 B1 *  2/2010  Becker ............. G01N 23/20016
                                                    378/205
(Continued)

FOREIGN PATENT DOCUMENTS

DE    1806741 A1    6/1969
DE   10015773 A1   10/2001
(Continued)

OTHER PUBLICATIONS

Burkhardt et al., "Fast high-pressure freezing of protein crystals in their mother liquor," Acta Crystallographica Section F: Structural Biology and Crystallization Communications, 2012, F68, pp. 495-500.
(Continued)

*Primary Examiner* — Kiho Kim
(74) *Attorney, Agent, or Firm* — Hodgson Russ LLP (57) ABSTRACT

A modular specimen holder (10') for high pressure freezing and/or X-ray crystallography of a specimen has a specimen holding element (100') and an extension element (200') connectable with and separable from each other; the specimen holding element (100') including a tubule (120') adapted to hold the specimen and a base element (110') adapted to hold the tubule (120'), wherein a distance from a bottom of the base element (110') to a top of the tubule (120') is a first distance (d1); the extension element (200') being
(Continued)

connectable with the base element (110'), wherein, when the extension element (200') and the base element (110') are connected with each other, a second distance (d2) from a bottom of the extension element (200') to the top of the tubule (120') is larger than the first distance (d1).

21 Claims, 9 Drawing Sheets

(51) Int. Cl.
      *G01N 1/42*           (2006.01)
      *G01N 23/20025*    (2018.01)
      *G01N 23/20041*    (2018.01)

(56) References Cited

U.S. PATENT DOCUMENTS 8,671,783 B2 * 3/2014 Fuhr ........................ A01N 1/02
                                                                             73/863.11

2005/0016442 A1   1/2005  Sanjoh
2011/0211674 A1   9/2011  Thorne et al.

FOREIGN PATENT DOCUMENTS

DE           10065143 A1     6/2002
WO    WO-9718896 A1 *  5/1997  ............... B01L 9/06
WO        03050598 A2     6/2003

OTHER PUBLICATIONS

Stuart et al., "SPINE: Structural Proteomics in Europe—the best of both worlds," Acta Crystallographica Section D: Biological Crystallography, 2006, D62, 2 pages.

"Spine Sample Holder & Vial Specifications-L-R05," Spine WP6, EMBL-G, 2014, 3 pages.

* cited by examiner

MODULAR SPECIMEN HOLDERS FOR HIGH PRESSURE FREEZING AND X-RAY CRYSTALLOGRAPHY OF A SPECIMEN

CROSS-REFERENCE TO RELATED APPLICATIONS

The present application is the U.S. national phase of International Application No. PCT/EP2017/067696 filed Jul. 13, 2017, which claims priority of European Application No. 16186050.7 filed Aug. 26, 2016, the entire disclosure of which is incorporated herein by reference.

FIELD OF THE INVENTION

The present invention relates to modular specimen holders for high pressure freezing and X-ray crystallography and to a method of high pressure freezing and X-ray crystallography of a specimen using a modular specimen holder of that kind.

BACKGROUND OF THE INVENTION

X-ray crystallography is a method of identifying the atomic and/or molecular structure of a crystal. The specimen is targeted by a beam of X-ray radiation, which is diffracted by the crystalline structure of the specimen. By measuring the angles and intensities of the diffracted beams, a three-dimensional model of the density of electrons within the crystal can be produced. From this electron density, the mean positions of the atoms in the crystal can be determined, as well as their chemical bonds, their disorder and various other information. The X-ray radiation for the X-ray crystallography can e.g. be produced by a synchrotron.

X-ray crystallography can be used to determine the structure of large biomolecules such as proteins. In order to reduce X-ray-induced radiation damages to the protein crystals during the X-ray crystallography, the specimen can be cooled to cryogenic temperatures prior to the X-ray crystallography by means of high pressure freezing.

High pressure freezing (HPF) is a method for rapid freezing of water-containing specimen or preparations under high pressure. By means of the high pressure freezing a vitrification (i.e., freezing with no formation of ice crystals) of the specimen is achieved, in the course of which water is transformed from a liquid to an amorphous state without inducing the nucleation of ice crystals. Thus, a cryo-fixation or cryo-immobilisation of the specimen can be achieved. Cellular constituents of the specimen can be fixed without introducing significant structural alterations.

For an elaborate description of high pressure freezing of protein crystals it is referred to Burkhardt, Anja et al. "Fast High-Pressure Freezing of Protein Crystals in Their Mother Liquor." *Acta Crystallographica Section F: Structural Biology and Crystallization Communications* 68.Pt 4 (2012): 495-500. PMC. Web. 24 Aug. 2016.

For high pressure freezing of a specimen, usually a first specimen holder is used. After the freezing process, the specimen has to be separated from the first specimen holder and has to be placed on a second specimen holder for X-ray crystallography. This transport between different specimen holders is an elaborate and time consuming procedure and yields the danger of damaging and contaminating the specimen.

It is desirable to minimise the transport efforts and to reduce the danger of damaging or contaminating the specimen between the steps of high pressure freezing and X-ray crystallography.

SUMMARY OF THE INVENTION

This object is achieved by modular specimen holders and by a method of high pressure freezing and/or X-ray crystallography of a specimen according to the features of the independent claims. Further advantages and embodiments of the invention will become apparent from the dependent claims and the following description and the embodiments according to the appended figures. Advantages and embodiments of the modular specimen holders according to the invention and of the method according to the invention arise from the following in an analogous manner.

The modular specimen holders according to the invention are particularly suitable for specimen comprising or consisting of biomolecules, particularly protein crystals, whose crystal structure shall be analysed in the course of the X-ray crystallography. The X-ray radiation for the X-ray crystallography can especially be produced by a synchrotron.

According to a first aspect of the invention, the modular specimen holder comprises a specimen holding element and an extension element, which are connectable with each other and, vice versa, separable from each other.

The specimen holding element comprises a tubule and a base element. The tubule is adapted to hold the specimen, particularly at a top of the tubule. For this purpose, the tubule can comprise a corresponding holding element, e.g. a loop. The base element is adapted to hold the tubule, particularly at the bottom of the tubule, i.e. at that tubule end, which does not hold the specimen. The tubule can particularly be firmly attached to the base element or be detachable from the base element. The base element particularly comprises a corresponding holding element for the tubule, which can e.g. be arranged on a top of the base element. The tubule is particularly arranged perpendicular or essentially perpendicular to a top surface of the base element.

A first distance from a bottom of the base element to the top of the tubule is $d_1$. This first distance $d_1$ is particularly dimensioned to fit in a high pressure freezing unit for high pressure freezing of the specimen holding element. The specimen holding element is thus specifically designed and dimensioned for a specific type of high pressure freezing unit. In order to conduct high pressure freezing of the specimen, preferably only the specimen holding element can be used without being connected to the extension element.

However, the specimen holding element per se can usually not be used for X-ray crystallography units, since the specimen holding element does not fit into corresponding crystallography units. Usually the specimen holding element is too small for these units. Thus, for conducting an X-ray crystallography of the specimen, the specimen holding element and the extension element are connected with each other. To this end, the extension element is adapted to be connected to the base element, particularly to a bottom surface of the base element. When the extension element and the base element are connected with each other, a second distance from a bottom of the extension element to the top of the tubule is $d_2$. The second distance $d_2$ is larger than the first distance $d_1$. The second distance $d_2$ is particularly dimensioned to fit in an X-ray crystallography unit for conducting an X-ray crystallography of the specimen.

The thus assembled modular specimen holder can be specifically designed and dimensioned for a specific type of X-ray crystallography unit. Particularly, the extension element is specifically designed and dimensioned to adapt the specimen holding element, which is as such not usable for X-ray crystallography, into a specimen holder usable in the corresponding X-ray crystallography unit.

According to a second aspect of the invention, the modular specimen holder comprises a specimen holding element and a cartridge, which are connectable with each other and, vice versa, separable from each other.

Analogously to the above description, this specimen holding element comprises a tubule adapted to hold the specimen and a base element adapted to hold the tubule.

The cartridge comprises an encapsulating element in its interior. The tubule and the encapsulating element are formed such that the tubule can be placed inside the encapsulating element. This encapsulating element can especially be constructed as a cavity inside the cartridge, particularly as a tubular cavity. The specimen holding element is thus designed to fit into the cartridge.

A diameter of said encapsulating element is particularly only slightly larger than a diameter of the tubule. After the freezing process, the connected specimen holding element and cartridge can be stored in the storage area. For X-ray crystallography, the specimen holding element is separated from the cartridge.

The specimen holding element is thus especially designed and dimensioned to perfectly fit into the cartridge. The combination of specimen holding element and cartridge is specifically designed for a specific type of high pressure freezing unit. In order to conduct high pressure freezing of the specimen, the specimen holding element and the cartridge are connected with each other.

The invention enables an easy way to conduct both the high pressure freezing and the subsequent X-ray crystallography of a specimen with the same specimen holder. In contrast to the invention, according to the prior art, the specimen is first frozen using a first specimen holder, which can only be used in the corresponding high pressure freezing unit; then, the specimen has to be separated from the first specimen holder and has to be placed onto a second specimen holder, which can only be used in the corresponding X-ray crystallography unit. This second specimen holder can be inserted into the crystallography unit and X-ray crystallography can be conducted. In contrast to that, according to the present invention, the specimen does not have to be transported between different specimen holders, which is an elaborate and time consuming procedure and yields the danger of damaging or contaminating the specimen.

The invention also relates to a (first) system comprising the modular specimen holder according to the first aspect of the invention and an X-ray crystallography unit for conducting an X-ray crystallography of the specimen. The invention also relates to a (second) system comprising the modular specimen holder according to the second aspect of the invention and a high pressure freezing unit for high pressure freezing of the specimen. Finally, the invention also relates to a combined system comprising the first and second systems.

In the course of the method according to the present invention, the specimen holding element holding the specimen is connected with the cartridge. The connected cartridge and specimen holding element are placed in the corresponding high pressure freezing unit. High pressure freezing of the specimen is conducted by means of the high pressure freezing unit. Afterwards, the frozen specimen can either immediately be analysed in the course of the crystallography. Alternatively, the frozen specimen can be stored in an expedient cryo-storage area, which can e.g. be cooled by liquid nitrogen to cryogenic temperatures. For this purpose, the connected specimen holding element and cartridge can be transported to and stored in the corresponding storage area. From there, the specimen holding element is collected and transported to the crystallography unit.

In order to conduct the X-ray crystallography, the frozen specimen holding element is separated from the cartridge and connected with the extension element. The connected specimen holding element and extension element forming the modular specimen holder are placed in the corresponding X-ray crystallography unit and the X-ray crystallography of the frozen specimen is conducted by means of the X-ray crystallography unit.

The extension element can be connected with the specimen holding element straight after the freezing and the combined specimen holding element, cartridge and extension element can be stored in a cryogenic storage area. Alternatively, the connected specimen holding element and cartridge can be stored. Alternatively, only the specimen holding element can be stored in the storage area and can be connected with the extension element after having been collected from the storage area.

A corresponding high pressure freezing unit is manufactured by the applicant under the trade name of Leica EM ICE, which replaces a former model named Leica EM HPM. According to a particularly advantageous embodiment of the invention, the distance from the bottom of the base element to the top of the tubule is dimensioned to fit in the high pressure freezing unit designed in the way of a Leica EM ICE. In this Leica EM ICE device or a device designed like that, liquid nitrogen is expediently used as both a pressure transfer medium and a coolant. The freezing cycle in this system can expediently be conducted as follows:

The freezing process is conducted inside a chamber, inside which the specimen is placed. Pressure build up is conducted downstream a closed vent, which is located in front of a chamber. By opening this vent nitrogen is injected into the chamber. This nitrogen stream is restricted by means of a nozzle at an exit of the chamber. Hence, pressure is built up inside the chamber. This stream of nitrogen usually does not have cryogenic temperatures. Freezing of the specimen is conducted after this pressure build up, i.e. after the specimen is set under pressure. For this purpose a compressed cryogenic medium with cryogenic temperature, e.g. liquid nitrogen, is conducted into the chamber.

By this device a pressure rise of especially up to 2000 bar in less than 10 ms can be achieved. The sample can be cooled immediately after reaching the 2000 bar pressure at a cooling rate of typically 5000 K/sec or higher. For a more detailed description of high pressure freezing it is referred to the documents DE 1 806 741 A1, DE 100 15 773 A1, or DE 100 65 143 A1.

The high pressure freezing unit Leica EM ICE or a corresponding unit designed in that way comprises a loading station. In order to conduct the freezing process, first the specifically constructed cartridge is placed in this loading station. Afterwards, the specimen holding element is placed in the loading station and is inserted into the cartridge. By closing a cover or lid of the loading station, the cartridge and the specimen holding element are connected with each other and the high freezing process is automatically triggered. After the freezing process, the combination of cartridge and specimen holding element is automatically ejected by the Leica EM ICE or the corresponding unit into a cooling bath of a cryogenic medium, especially liquid nitrogen, e.g. in a Dewar vessel.

This cartridge and the specimen holding element are specifically designed and dimensioned for the Leica EM ICE or for high pressure freezing unit designed in that way to enable an optimal freezing of the specimen. The specimen holding element is especially designed and dimensioned to perfectly fit into the cartridge. After the freezing process, the connected specimen holding element and cartridge can be stored in the storage area. For the X-ray crystallography, the specimen holding element is separated from the cartridge.

Advantageously, the distance from the bottom of the base element to the top of the tubule is in the range between 15 mm and 19 mm. In this case, the specimen holding element is designed to precisely fit into the cartridge and into the Leica EM ICE or a device like that. The Leica EM ICE allows a maximum height of 19 mm of the corresponding specimen holding element.

However, as pointed out before, the specimen holding element is per se usually not suitable for X-ray crystallography units. Sample holders for X-ray crystallography units are usually constructed by various manufacturers according to standards of the so called SPINE consortium. SPINE (Structural Proteomics IN Europe) was founded to push forward with technologies aimed at biomedically relevant targets and to generate a pan-European integration on biomedically focused structural proteomics. For a detailed explanation of SPINE see Stuart, D. I., Jones, E. Y., Wilson, K. S. & Daenke, S. (2006), Acta Cryst. D62, -2--1.

The specific characteristics of corresponding sample holders are given in the document "SPINE SAMPLE HOLDER & VIAL SPECIFICATIONS-L-R05" revised on 15 Apr. 2014, which is available on the homepage:
https://www.embl.fr/spinesampleholder/
According to this SPINE standard, a corresponding sample holder consists of a cap and a pin. A crystal support, especially a loop, is mounted on said pin. Said cap is a support of the pin. The sample holder length, which is defined as the distance from the base of the cap to the crystal (or beam position), e.g. the top of the pin, is 22 mm. By this fixed sample holder length the SPINE consortium wants to achieve a compatibility of different kinds of sample changers for X-ray crystallography units. Thus, the distance from the bottom of the cap, at which a sample changer grabs the sample holder or is attached to the sample holder, to the position of the sample, at which an X-ray beam hast to be directed in order to conduct the crystallography, is always 22 mm.

Advantageously, when the extension element and the base element are connected with each other, the second distance $d_2$ from the bottom of the extension element to the top of the tubule is in the range of 22 mm±1.5 mm. Since the specimen is not necessarily placed precisely at the top of the tubule, there is preferably a tolerance range of ±1.5 mm. The distance from the bottom of the extension element to the top of the tubule is thus preferably dimensioned according to the SPINE standard. The modular sample holder can thus be used in any kind of X-ray crystallography unit designed according to the SPINE standard. Preferably, a diameter of the bottom of the extension element is essentially or precisely 12 mm. This diameter is also set by the SPINE standard.

The invention therefore particularly provides a modular specimen holder, which can be used for high pressure freezing by means of a Leica EM ICE or by a unit designed that way and which is compatible with the SPINE standard and can thus be used for X-ray crystallography by means of an X-ray crystallography unit designed according to the SPINE standard.

Preferably, the cartridge is constructed as a single piece. The cartridge is thus especially constructed as a solid element which is not separable. However, the cartridge could also be embodied as two or several shells separable from each other.

Advantageously, the cartridge comprises connection means to connect the cartridge with the base element of the specimen holding element. Preferably, these connection means are constructed as magnetic connection means. These magnetic connection means particularly interact with the base element made of a metal material and thus establish a force-fitted connection between cartridge and specimen holding element.

Preferably, at least a part of the tubule is made of polyimide, especially Kapton. According to a particularly advantageous embodiment the tubule comprises a pin made of a metal material and a holding element adapted to hold the specimen made of polyimide, especially Kapton. Protein crystals are especially dissolved in a specific solution. The crystals can be placed in the Kapton-made element, particularly in the holding element, as specimen in this solution. The base element is especially made of steel anticorrosion coated or ferromagnetic stainless steel (especially stainless steel 430F or equivalent).

Advantageously, the base element is of cylindrical or essentially cylindrical shape comprising a lateral area and a top perpendicular to the lateral area. Preferably, the top of the base element is constructed as a plane or essentially plane sheet. This sheet especially can e.g. comprise a hole, into which the tubule can be inserted. This hole is especially located in the centre of the plane sheet. The top can preferably be constructed as a plane or essentially plane sheet with a stepped outer rim, particularly in order to place the specimen holding element precisely inside the cartridge.

The base element is preferably hollow in its interior. The bottom of the base element preferably comprises an opening. Particularly, essentially the entire bottom of the base element can form this opening. In the hollow interior of the base element expedient guiding means for a precise insertion of the tubule into the corresponding tube of the cartridge can be arranged. Particularly, a mechanical guiding element can be attached to these guiding means. For this purpose, the mechanical guiding element can especially be inserted into the specimen holding element through the opening in the bottom of the base element. By means of this mechanical guiding element, the specimen holder can especially be inserted in the cartridge.

Preferably, the extension element comprises connection means adapted to interact with the interior of the base element, especially with its inner surfaces, thus establishing the connection of the specimen holding element and the extension element. In the interior of the base element, corresponding second connection means can be arranged, which can interact with the extension element's connection means. The connection means of the extension element are advantageously adapted to be inserted into the interior of the base element through the opening in the bottom or formed by the bottom of the base element.

The corresponding connection means are advantageously adapted to establish a magnetic and/or mechanical connection of the specimen holding element and the extension element. The connection means of the extension element can for example be constructed as one or several clamping elements, establishing a force-fitted connection between specimen holding element and extension element. In this case, there are not necessarily second connection means in the interior of the base element. The force-fitted connection can be established by the clamping means pressing or forcing or being biased against the interior wall of the base element. A force-fitted connection can also be established by magnetic connection means which can interact with metal interior wall elements of the base element. The connection means can especially establish a form-fitted connection. For this purpose, the connection means and/or the second connection means can be embodied as threads.

It should be noted that the previously mentioned features and the features to be further described in the following are usable not only in the respectively indicated combination, but also in further combinations or taken alone, without departing from the scope of the present invention.

BRIEF DESCRIPTION OF THE DRAWING VIEWS

The present invention will now be described further, by way of example, with reference to the accompanying drawings, in which FIG. 1 schematically shows a preferred embodiment of a modular specimen holder with specimen holding element and extension element according to the invention in different perspective views, FIG. 2 schematically shows a preferred embodiment of a modular specimen holder with specimen holding element and extension element according to the invention in different perspective views, FIG. 3 schematically shows a preferred embodiment of a modular specimen holder with specimen holding element, extension element, and cartridge according to the invention in different perspective views, and FIG. 4 schematically shows a part of a high pressure freezing unit with a specimen holding element and a cartridge of a modular specimen holder according to the invention in a perspective view.

DETAILED DESCRIPTION

Figure 1A:
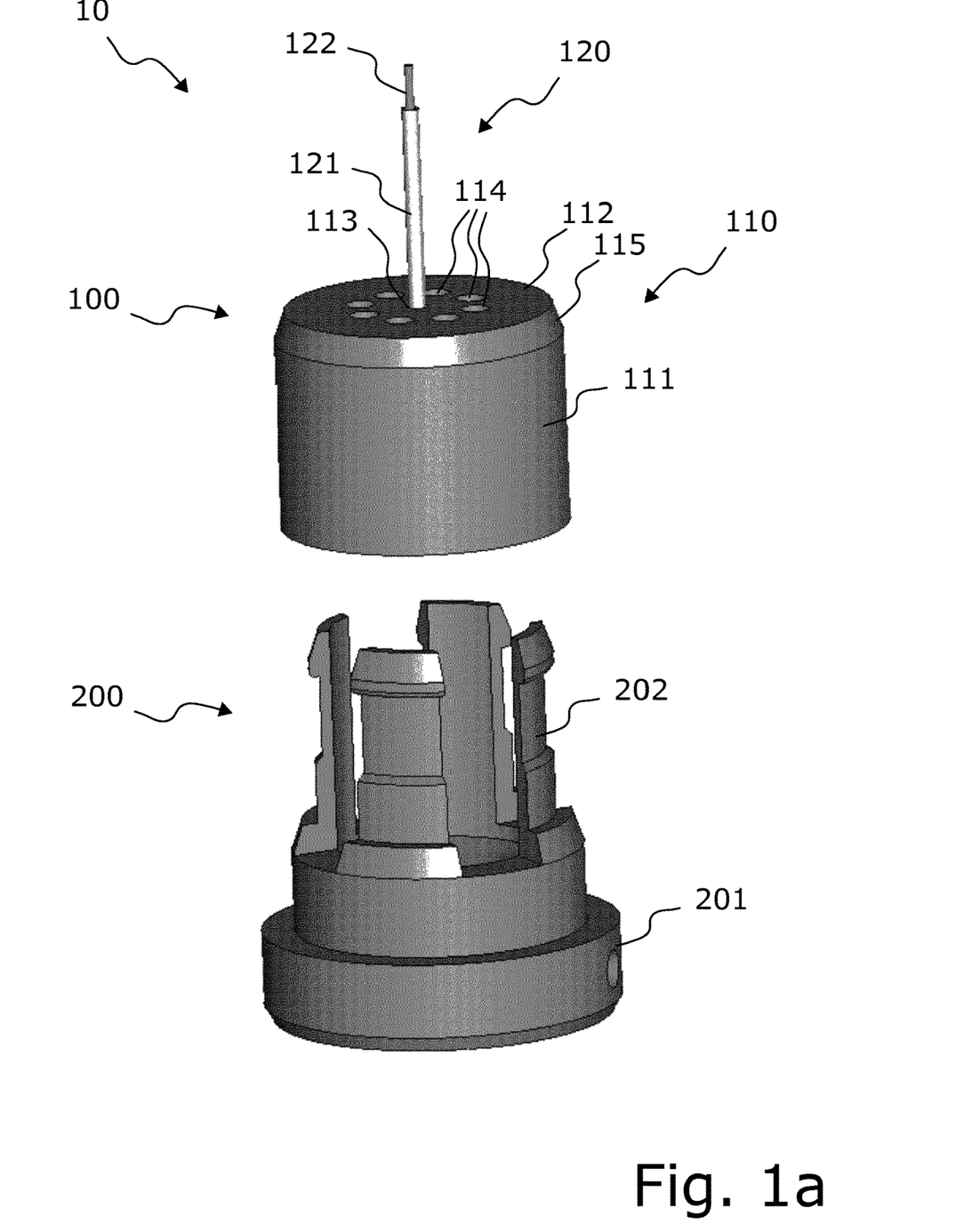
Figure 1B:
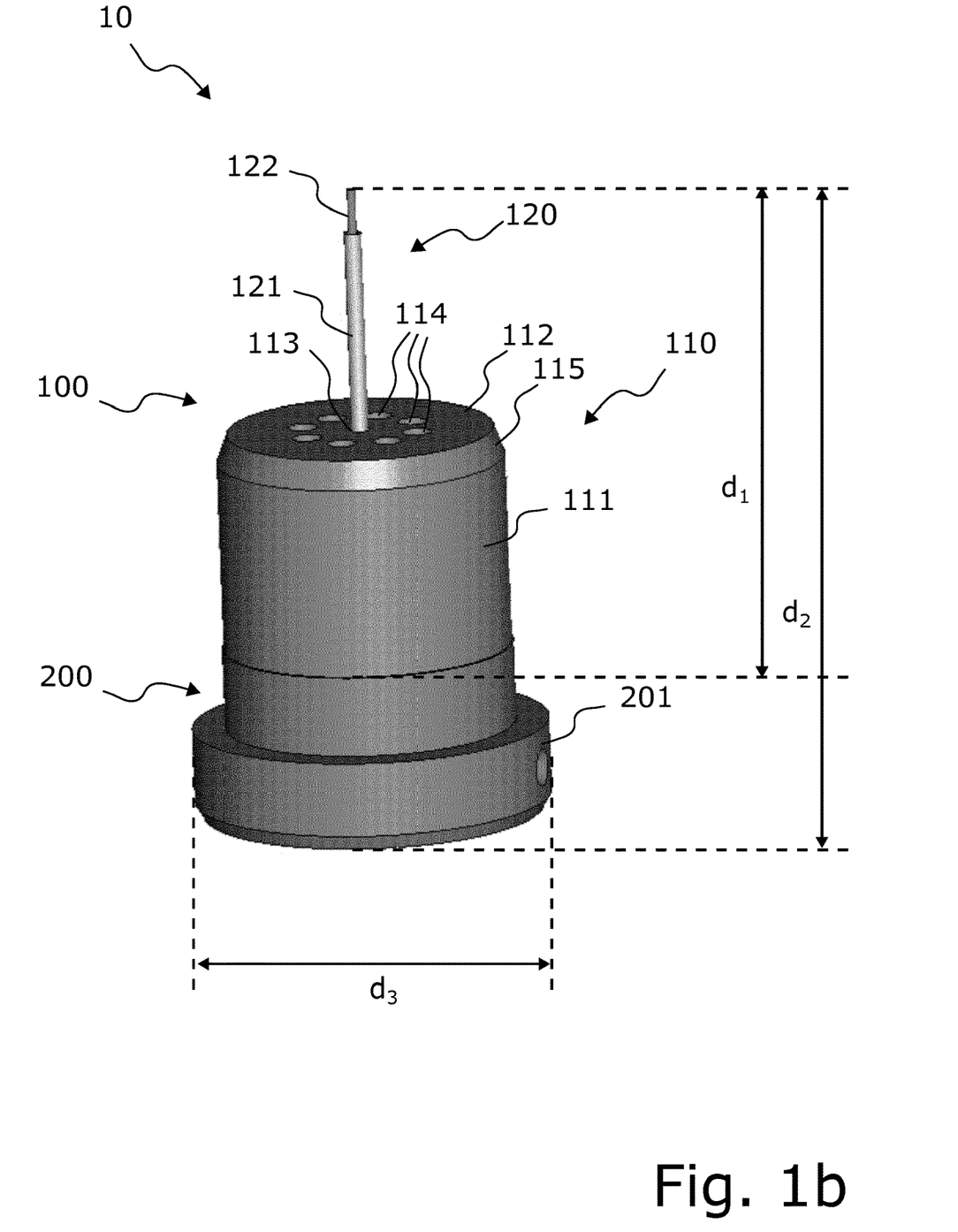

In FIG. 1 a preferred embodiment of a modular specimen holder with specimen holding element and extension element according to the invention is schematically shown and labelled as 10. The modular specimen holder 10 is shown in FIG. 1a in a perspective exploded view and in FIG. 1b in its compound state in a perspective view. Identical reference signs in the figures refer to identical or structurally identical elements.

In FIG. 1a, the two modules of the specimen holder 10, i.e. the specimen holding element 100 and the extension element 200 are shown separated from each other.

The specimen holding element 100 comprises a base element 110 and a tubule 120. The tubule 120 comprises a pin 121 made of a metal material on which a holding element 122 made of polyimide, preferably Kapton, is mounted. A specimen can be placed in this holding element 122. The holding element 122 is particularly constructed as a small Kapton tube, inside which protein crystals can be placed as specimen in a specific solution, in which they are dissolved.

The holding element 122 can e.g. also be constructed as a loop. The tubule 120 can especially be constructed as a so called Hampton pin.

The base element 110 is adapted to hold the tubule 120 and is of cylindrical or essentially cylindrical shape comprising a lateral area 111 and a top 112 perpendicular to the lateral area 111. The interior of the base element 110 is particularly hollow. Guiding means can be provided on the inner wall of the lateral area 111 in order to insert the specimen holding element 100 in a cartridge as will be explained with reference to FIG. 3 and FIG. 4.

The top 112 can be constructed as a plane or essentially plane sheet, particularly with a stepped outer rim 115. This stepped outer rim 115 is especially provided in order to enable a centred positioning of the specimen holding element 100 inside the cartridge, as will be explained with reference to FIG. 3.

There is no sheet at the bottom of the base element 110. Thus, the bottom of the base element 110 forms an opening. The base element 110, i.e. the lateral area 111 and the top 112, are made of metal, e.g. ferromagnetic stainless steel.

The base element 110 particularly comprises a holding element for the tubule 120 in form of a borehole 113 in the centre of the sheet 113, into which the tubule 120 can be inserted. The tubule 120 is thus arranged perpendicular or essentially perpendicular to the top 112 of the base element.

There are several more boreholes 114 circumferential to the centre of the sheet 112 for conducting liquid nitrogen in the course of the high pressure freezing.

The extension element 200 comprises a base 201 on which connection means 202 are arranged. These connection means 202 are adapted to connect the specimen holding element 100 with the extension element 200.

The connection means 202 can be inserted into the hollow interior of the base element 110 through the opening in the bottom of the base element 110. In this particular example, the connection means 202 are embodied as clamping elements, establishing a force-fitted connection between specimen holding element 100 and extension element 200 by pressing or forcing against the interior wall of the base element 110.

The modular specimen holder 10 is shown in FIG. 1b in its compound state, i.e. with the specimen holding element 100 and the extension element 200 connected with each other. In FIG. 1b, a distance from a bottom of the extension element 200 to the top of the tubule 120 is $d_2$. This distance $d_2$ is 22 mm±1.5 mm and is hence dimensioned according to the SPINE standard. Particularly, the set distance of 22 mm of the SPINE standard refers to the distance from the bottom of the extension element 200 to the specimen. Thus, if the specimen is not placed exactly at the edge of the holding element 122, the distance $d_2$ can be slightly larger than 22 mm.

Thus, the distance $d_2$ is dimensioned to fit in an X-ray crystallography unit for conducting an X-ray crystallography of the specimen constructed according to the SPINE standard. Moreover, a diameter $d_3$ of a bottom of the extension element 200 is essentially or precisely 12 mm and thus also dimensioned according to the SPINE standard.

In its compound state, the modular specimen holder 10 thus fulfils the requirements of the SPINE standard. However, the compound modular specimen holder 10 cannot be used for specific types of high pressure freezing units, particularly Leica EM ICE or of similar design.

When separated from each other, however, the specimen holder can be used in the Leica EM ICE or a device designed in that way. This device allows a maximum height of 19 mm of the corresponding specimen holding element. Thus, a distance $d_1$ from a bottom of the base element 110 to the top of the tubule 120 is at most 19 mm, particularly in the range between 15 mm and 19 mm, and is thus dimensioned to fit in a high pressure freezing unit in form of the Leica EM ICE.

In FIG. 2 another preferred embodiment of a modular specimen holder according to the invention is schematically shown and labelled as 10' with specimen holding element 100' and extension element 200'.

Figure 2A:
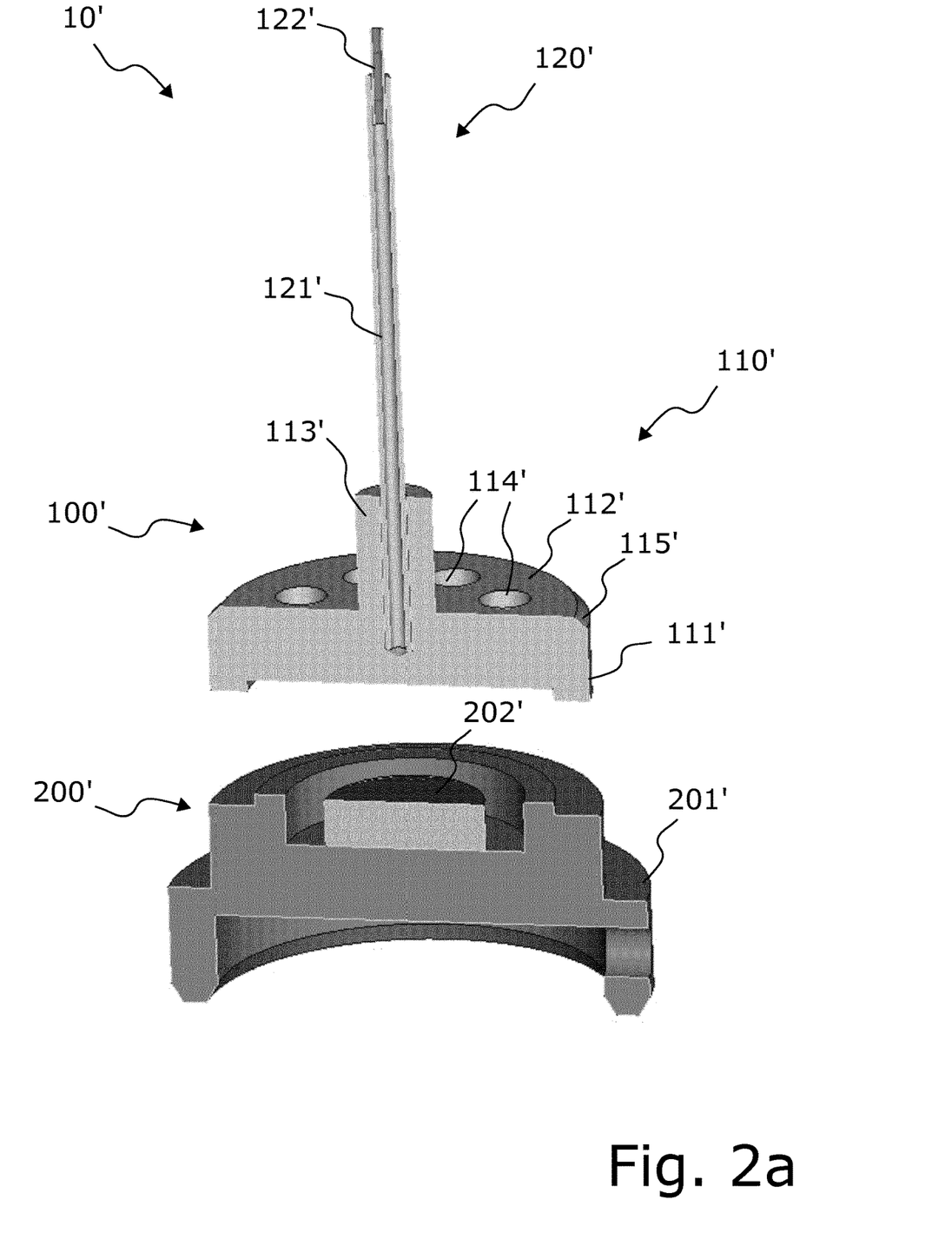
Figure 2B:
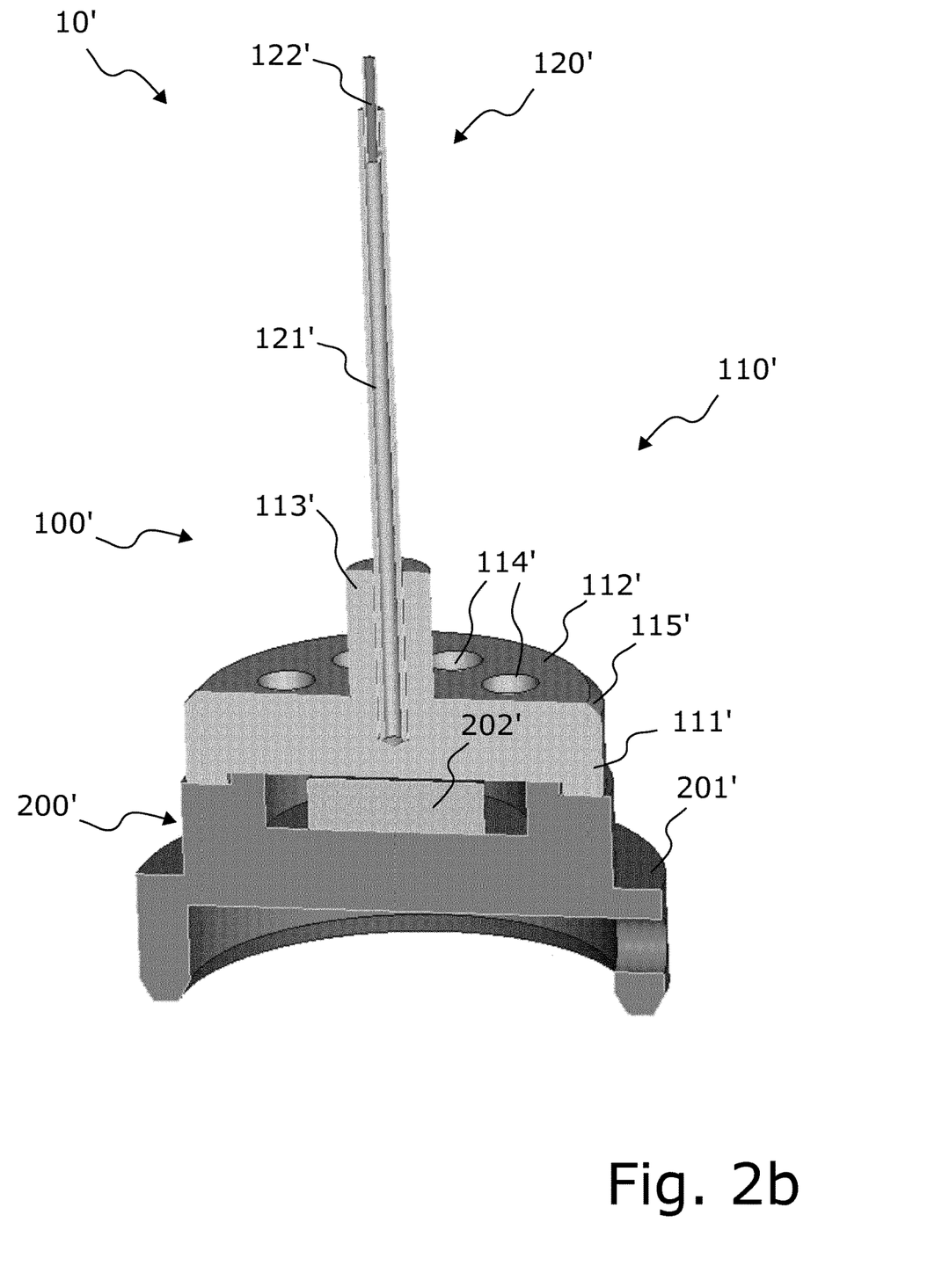
Figure 2C:
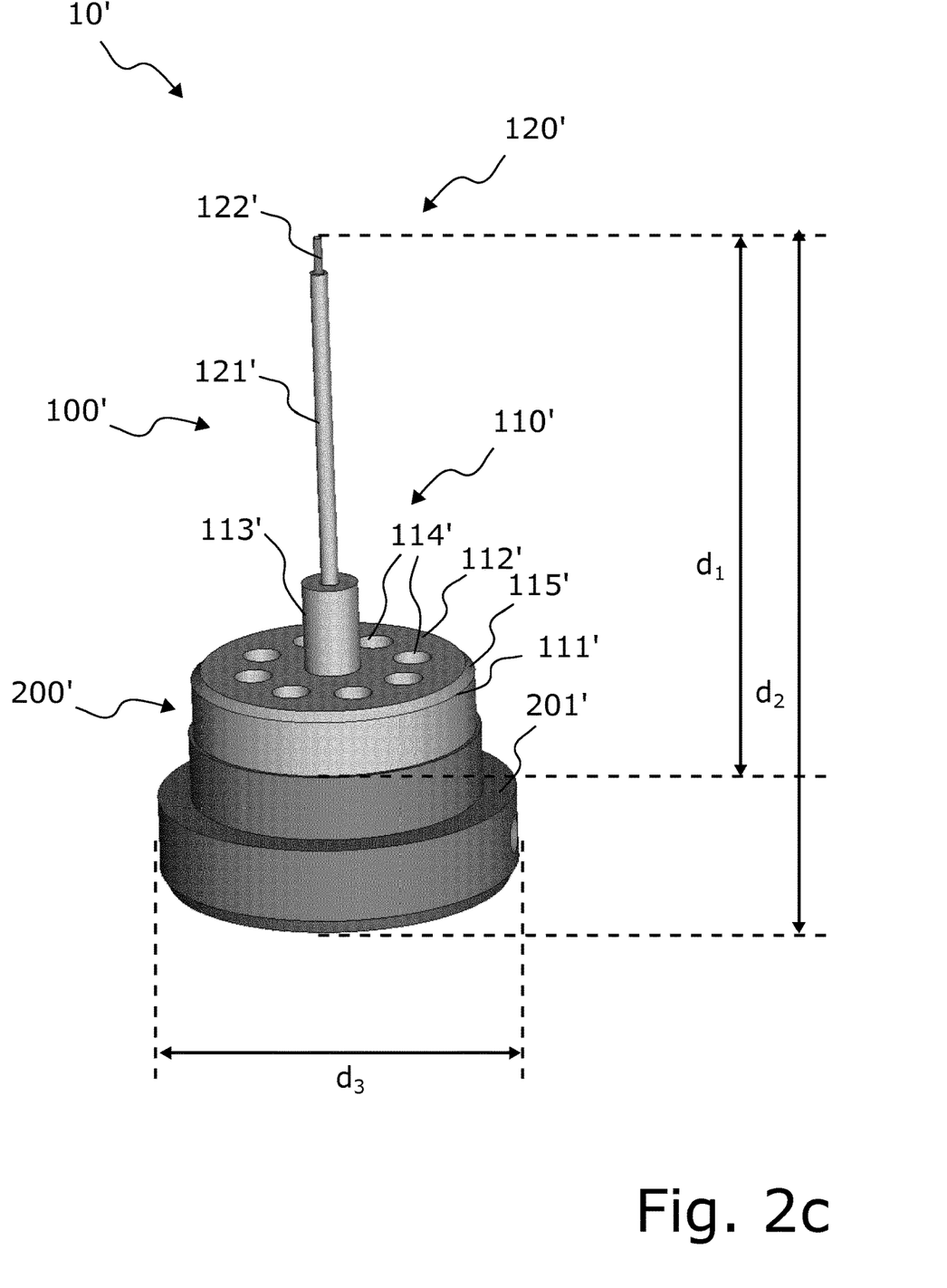

FIG. 2a shows the modular specimen holder 10' in a perspective sectional view with specimen holding element 100' and extension element 200' separated from each other. FIG. 2b is a perspective a sectional view of specimen holding element 100' and extension element 200' connected with each other. FIG. 2c is a perspective view analogously to FIG. 2b.

Analogously, to the modular specimen holder 10 of FIG. 1, also the modular specimen holder 10' of FIG. 2 comprises a base element 110' adapted to hold the tubule 120' comprising a metal pin 121' and a Kapton holding element 122'. A holding element 113' for the tubule 120' is constructed as a cylinder.

The base element 110' is of cylindrical or essentially cylindrical shape. In contrast to the base element 110 of FIG. 1, this base element 110' is not hollow in its interior but an essentially solid cylinder with lateral area 111' and top 112'. Boreholes 114' inside the base element 110' are provided for conducting liquid nitrogen in the course of the high pressure freezing. The cylindrical base element 110' can in this case have a height from the bottom to the top surface 112' in the range between e.g. 1 mm and 3 mm.

The extension element 200' comprises a base 201' and connection means 202'. In this example the connection means 202 are constructed as magnetic connection means in order to establish a force-fitted connection between specimen holding element 100' and extension element 200'. For this purpose one or several magnets 202' are provided which can interact with the base element 110' made of metal.

Analogously to FIG. 1b, the first distance $d_1$ from the bottom of the base element 110' to the top of the tubule 120' is in the range between 15 mm and 19 mm, and is thus dimensioned to fit in a high pressure freezing unit in form of the Leica EM ICE.

The second distance from the bottom of the extension element 200' to the top of the tubule 120' is $d_2$ and is in the range 22 mm±1.5 mm and is hence dimensioned according to the SPINE standard.

Moreover, the diameter $d_3$ of the bottom of the extension element 200' is essentially or precisely 12 mm and thus also dimensioned according to the SPINE standard.

According to the invention, the specimen holding element is also connectable with a cartridge for high pressure freezing, as will now be explained in reference to FIG. 3.

FIG. 3 shows the specimen holding element 100' and the extension element 200' of FIG. 2 as well as a corresponding cartridge 300.

Figure 3A:
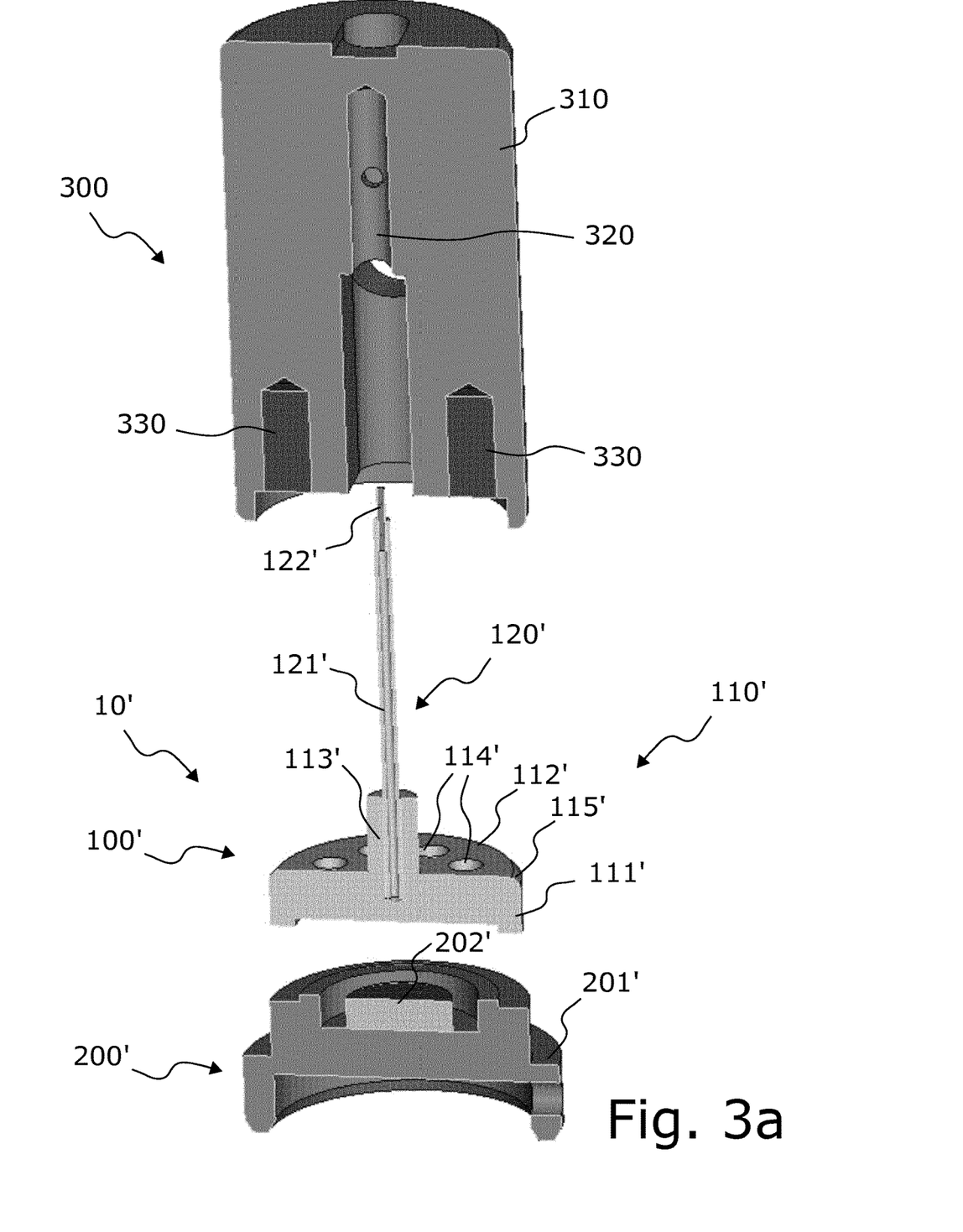
Figure 3B:
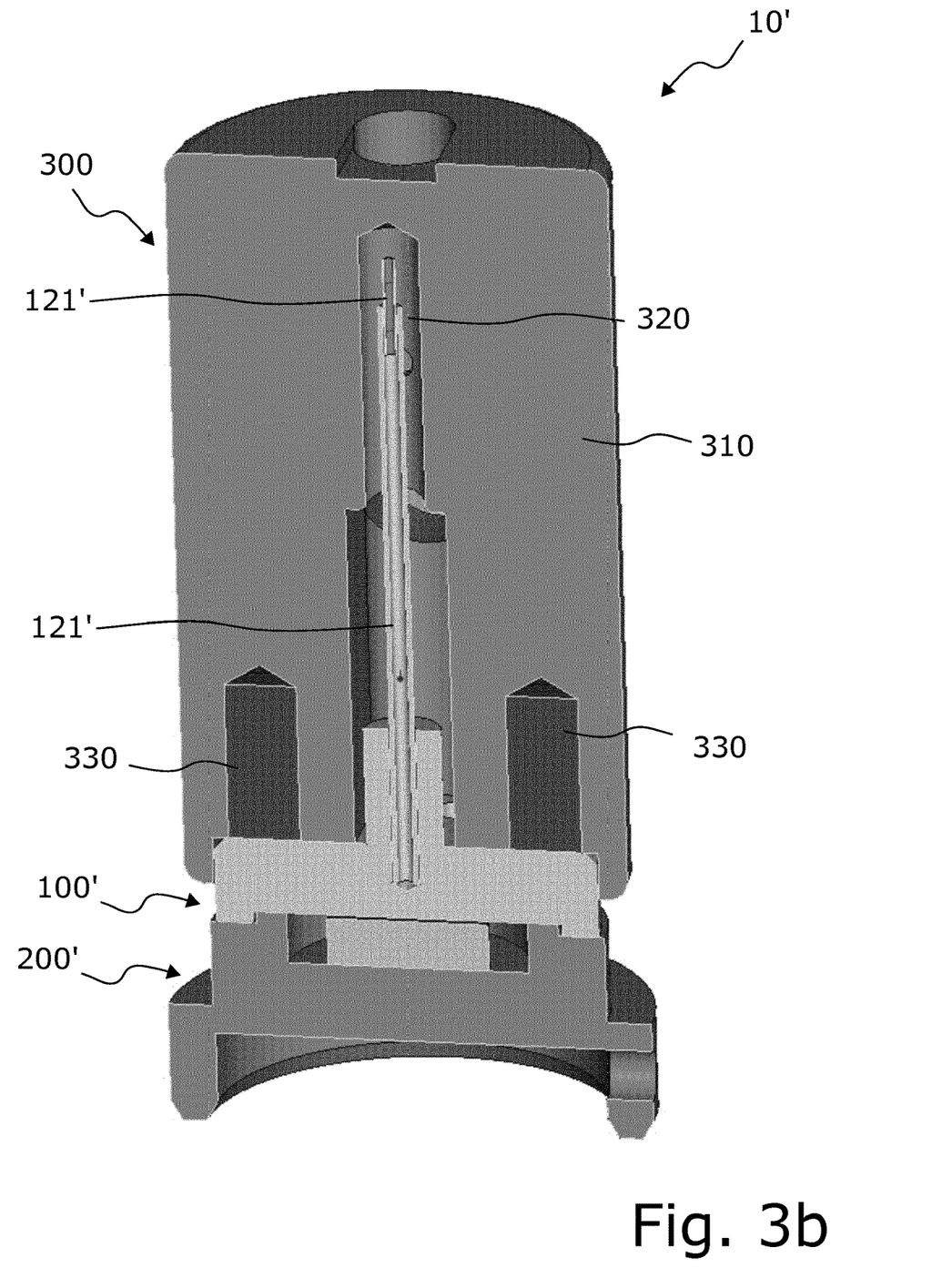
Figure 3C:
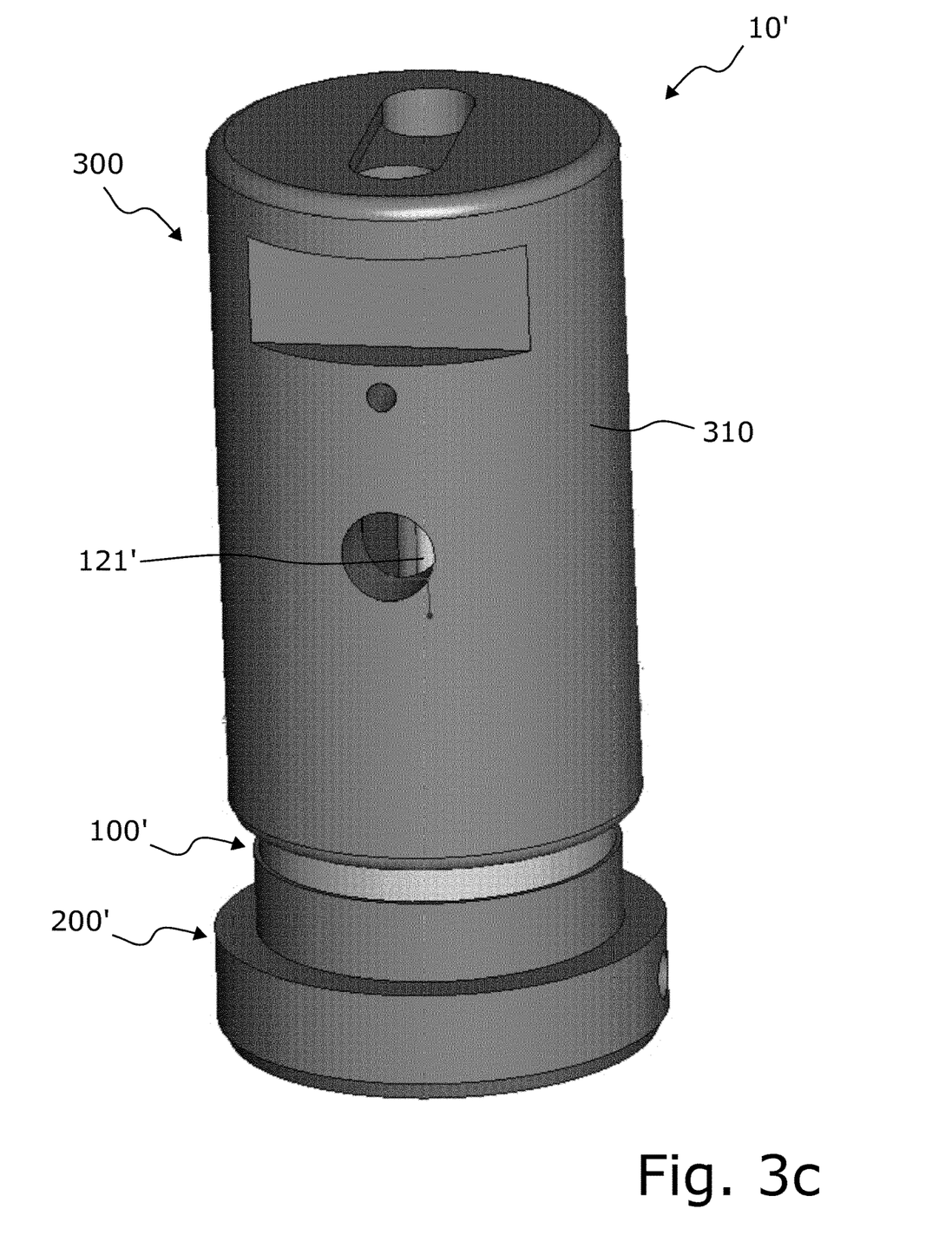

FIG. 3a shows the three modules 100', 200', and 300 separated from each other in a perspective sectional view. These modules 100', 200', and 300 are shown connected with each other in a perspective sectional view in FIG. 3b and in a perspective view in FIG. 3c The cartridge 300 has an encapsulating element 320 in its interior in the form of a tubular cavity. This tubular cavity 320 is located inside a casing 310 of the cartridge 300. The tubule 120' is adapted to be placed inside this tubular cavity 320. A diameter of said tubular cavity 320 is particularly only slightly larger than a diameter of the tubule 120'.

Moreover, connection means 330 are provided inside the casing 310 in order to connect the cartridge 300 with the specimen holding element 100'. These connection means 330 are preferably constructed as magnetic connection means 330, e.g. one or several magnets. These magnets 330 can interact with the base element 110' in order to establish a force-fitted connection between cartridge 300 and the metal base element 110'.

Figure 4:
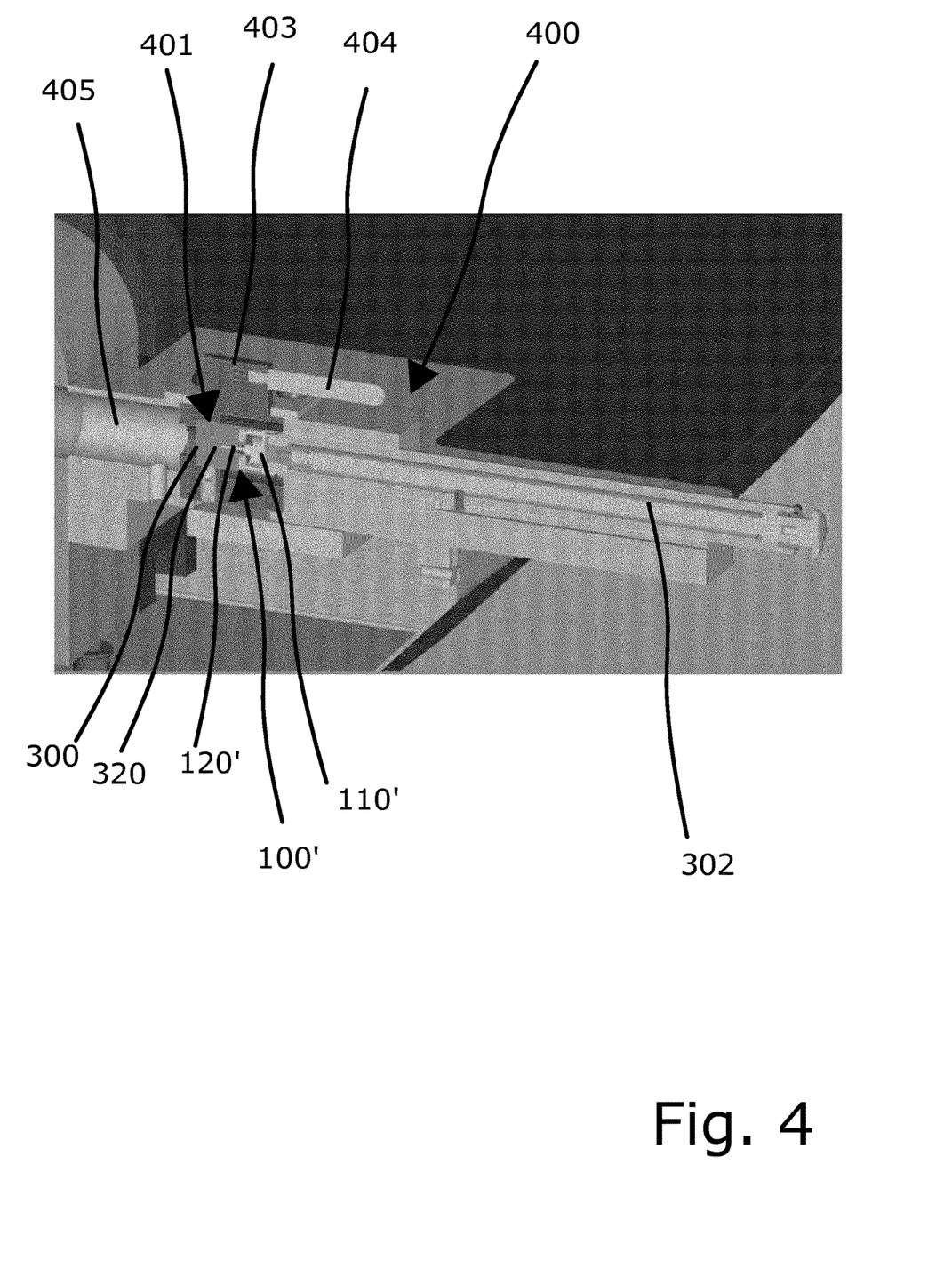

In FIG. 4, a part of a high pressure freezing unit in form of the Leica EM ICE is schematically shown in a perspective view. Particularly, a loading station 400 of the Leica EM ICE is shown, into which the specimen is loaded for high pressure freezing.

The loading station 400 comprises a chamber 401, into which firstly the cartridge 300 is loaded by a mechanical guiding element 402, e.g. a rod. Afterwards the specimen holding element 100' is positioned in the chamber by the mechanical guiding element 402 and is thus inserted into the cartridge 300.

For loading the specimen holding element 100' into the chamber 401, the mechanical guiding element 402 is connected with guiding means in the interior of the base element 110' of the specimen holding element 100'. The mechanical guiding element 402 enables precise insertion of the specimen holding element 100' in the cartridge 300 without damaging the specimen.

It is also possible to provide two different mechanical guiding elements; a first one for loading the cartridge into the chamber 401 and a second one for the specimen holder.

When both the cartridge 300 and the specimen holding element 100' are loaded into the chamber 401, a lid 404 with a handle 404 is closed. Closing this lid 403 triggers the high pressure freezing of the specimen. For this purpose, the cartridge 300 and the specimen holding element 100' are connected with each other and transported through a conduit 405 into the interior of the Leica EM ICE, where the high pressure freezing process is conducted.

After the freezing process, the combination of cartridge 300 and specimen holding element 100' is automatically ejected by the Leica EM ICE into a cooling bath of a cryogenic medium, especially liquid nitrogen, e.g. in a Dewar vessel.

REFERENCE SIGNS 10 modular specimen holder
100 specimen holding element
110 base element
111 lateral area of the base element
112 top of the base element, sheet
113 holding element for the tubule 120, borehole
114 boreholes
120 tubule
121 pin
122 holding element
200 extension element
201 base
202 connection means, clamping elements
10' modular specimen holder
100' specimen holding element
110' base element
111' lateral area of the base element
112' top of the base element, sheet
113' holding element for the tubule 120'
114' boreholes
120' tubule
121' pin
122' holding element
200' extension element
201' base
202' connection means, magnet
300 cartridge 310 casing of the cartridge
320 encapsulating element, tubular cavity
330 connection means, magnets
400 loading station of a high pressure freezing unit
401 chamber
402 mechanical guiding element, rod
403 lid
404 handle
405 conduit

What is claimed is:

1. A modular specimen holder (10, 10') for high pressure freezing and/or X-ray crystallography of a specimen comprising a specimen holding element (100, 100') and an extension element (200, 200') connectable with each other and separable from each other;
    the specimen holding element (100, 100') comprising a tubule (120, 120') and a base element (110, 110'), wherein:
        the tubule (120, 120') is adapted to hold the specimen,
        the base element (110, 110') is adapted to hold the tubule (120, 120'),
        a distance from a bottom of the base element (110, 110') to a top of the tubule (120, 120') is a first distance ($d_1$);
    the extension element (200, 200') being adapted to be connected with the base element (110, 110'), wherein, when the extension element (200, 200') and the base element (110, 110') are connected with each other, a distance from a bottom of the extension element (200, 200') to the top of the tubule (120, 120') is a second distance ($d_2$);
    wherein the second distance ($d_2$) is larger than the first distance ($d_1$);
    wherein the first distance (d1) from the bottom of the base element (110, 110') to the top of the tubule (120, 120') is dimensioned to fit in a high pressure freezing unit.

2. The modular specimen holder (10, 10') according to claim 1, wherein the first distance ($d_1$) is dimensioned to fit in a high pressure freezing unit for high pressure freezing of the specimen holding element (100, 100').

3. The modular specimen holder (10, 10') according to claim 1, wherein the second distance ($d_2$) is dimensioned to fit in an X-ray crystallography unit for conducting an X-ray crystallography of the specimen.

4. The modular specimen holder (10, 10') according to claim 1, wherein at least a part of the tubule (120, 120') is made of polyimide.

5. The modular specimen holder (10, 10') according to claim 1, wherein the tubule (120, 120') comprises a pin (121, 121') and a holding element (122, 122'), wherein the pin (121, 121') is made of a metal material and wherein the holding element (122, 122') is adapted to hold the specimen and is made of polyimide.

6. The modular specimen holder (10, 10') according to claim 1, wherein the base element (110, 110') is of cylindrical or essentially cylindrical shape comprising a lateral area (111, 111') and a top (112, 112') perpendicular to the lateral area (111, 111').

7. The modular specimen holder (10, 10') according to claim 6, the top (112, 112') of the base element (110, 110') being constructed as a plane or essentially plane sheet or as a plane or essentially plane sheet with a stepped outer rim (115, 115').

8. The modular specimen holder (10, 10') according to claim 1, the base element (110, 110') being hollow in its interior and the bottom of the base element comprising or forming an opening.

9. The modular specimen holder (10, 10') according to claim 8, wherein the extension element (200, 200') comprises connection means (202, 202') adapted to interact with the base element (110, 110'), thus establishing the connection of the specimen holding element (100, 100') and the extension element (200, 200'), the connection means (202, 202') of the extension element being adapted to be inserted into the interior of the base element (110, 110') through the opening in the bottom of the base element (110, 110').

10. The modular specimen holder (10, 10') according to claim 1, wherein the extension element (200, 200') comprises connection means (202, 202') adapted to interact with the base element (110, 110'), thus establishing the connection of the specimen holding element (100, 100') and the extension element (200, 200').

11. The modular specimen holder (10, 10') according to claim 10, wherein the connection means (202, 202') are adapted to establish a magnetic and/or mechanical connection of the specimen holding element (100, 100') and the extension element (200, 200').

12. The modular specimen holder (10, 10') according to claim 1, wherein a diameter ($d_3$) of the bottom of the extension element (200, 200') is essentially 12 mm.

13. The modular specimen holder (10, 10') according to claim 1, wherein the first distance ($d_1$) from the bottom of the base element (110, 110') to the top of the tubule (120, 120') is in a range between 15 mm and 19 mm.

14. The modular specimen holder (10, 10') according to claim 1, wherein the second distance ($d_2$) from the bottom of the extension element (200, 200') to the top of the tubule (120, 120') is in a range of 22 mm±1.5 mm.

15. The modular specimen holder (10, 10') according to claim 1, wherein the second distance ($d_2$) from the bottom of the extension element (200, 200') to the top of the tubule (120, 120') is dimensioned according to the SPINE standard.

16. A modular specimen holder (10, 10') for high pressure freezing and/or X-ray crystallography of a specimen comprising a specimen holding element (100, 100') and an extension element (200, 200') connectable with each other and separable from each other;
    the specimen holding element (100, 100') comprising a tubule (120, 120') and a base element (110, 110'), wherein:
        the tubule (120, 120') is adapted to hold the specimen,
        the base element (110, 110') is adapted to hold the tubule (120, 120'),
        a distance from a bottom of the base element (110, 110') to a top of the tubule (120, 120') is a first distance ($d_1$);
    the extension element (200, 200') being adapted to be connected with the base element (110, 110'), wherein, when the extension element (200, 200') and the base element (110, 110') are connected with each other, a distance from a bottom of the extension element (200, 200') to the top of the tubule (120, 120') is a second distance ($d_2$);
    wherein the second distance ($d_2$) is larger than the first distance ($d_1$);
    wherein the modular specimen holder (10, 10') further comprises a cartridge (300) connectable with the specimen holding element (100, 100') and separable from the specimen holding element (100, 100');
    the cartridge (300) comprising an encapsulating element (320) in its interior, wherein:
        the tubule (120, 120') and the encapsulating element (320) are formed such that the tubule (120, 120') can be placed inside the encapsulating element (320).

17. The modular specimen holder (10, 10') according to claim 16, wherein the encapsulating element (320) is constructed as a cavity inside the cartridge.

18. The modular specimen holder (10, 10') according to claim 16, wherein the cartridge (300) is constructed as a single piece.

19. The modular specimen holder (10, 10') according to claim 16, wherein the cartridge (300) comprises connection means (330) to connect the cartridge (300) with the base element (110, 110') of the specimen holding element.

20. The modular specimen holder (10, 10') according to claim 16, wherein the specimen holding element (100, 100') is designed to fit into the cartridge (300).

21. A method of high pressure freezing and X-ray crystallography of a specimen using a modular specimen holder (10, 10') according to claim 16, comprising the steps of:

connecting the specimen holding element (100, 100') holding the specimen and the cartridge (300) with each other;

placing the connected specimen holding element (100, 100') and the cartridge (300) in a high pressure freezing unit;

conducting a high pressure freezing of the specimen by means of the high pressure freezing unit;

separating the frozen specimen holding element (100, 100') and the cartridge (300) from each other;

connecting the frozen specimen holding element (100, 100') with the extension element (200, 200');

placing the connected specimen holding element (100, 100') and the extension element (200, 200') in an X-ray crystallography unit; and conducting an X-ray crystallography of the frozen specimen by means of the X-ray crystallography unit.

* * * * *